H. H. HIVELY.
SECTIONAL TIRE RIM.
APPLICATION FILED DEC. 30, 1916.

1,424,019.

Patented July 25, 1922.

Witnesses:

Inventor
H. H. Hively.

UNITED STATES PATENT OFFICE.

HAL HENERY HIVELY, OF TAR RIVER, OKLAHOMA.

SECTIONAL TIRE RIM.

1,424,019.  Specification of Letters Patent.  Patented July 25, 1922.

Application filed December 30, 1916. Serial No. 139,728.

*To all whom it may concern:*

Be it known that I, HAL HENERY HIVELY, a citizen of the United States, residing at Tar River, in the county of Ottawa and State of Oklahoma, have invented certain new and useful Improvements in Sectional Tire Rims; and I do hereby declare the following to be a full, clear, and exact description of the invention, such as will enable others skilled in the art to which it appertains to make and use the same.

This invention relates to a sectional tire rim and has for one of its objects the provision of an inner member having an annular flange adapted to be bolted to the felly of wheel and an outer member secured upon the inner member for removably supporting a tire or shoe on the wheel.

Another object of this invention is to provide the outer face of the inner member beveled to cooperate with the beveled inner face of the outer member whereby the outer member may be readily slid over the inner member when placing the tire or shoe on the wheel and which provides a greater binding action between the members as said members are moved in the direction of each other to secure the tire.

A further object of this invention is the provision of a sectional tire rim of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

Figure 1:
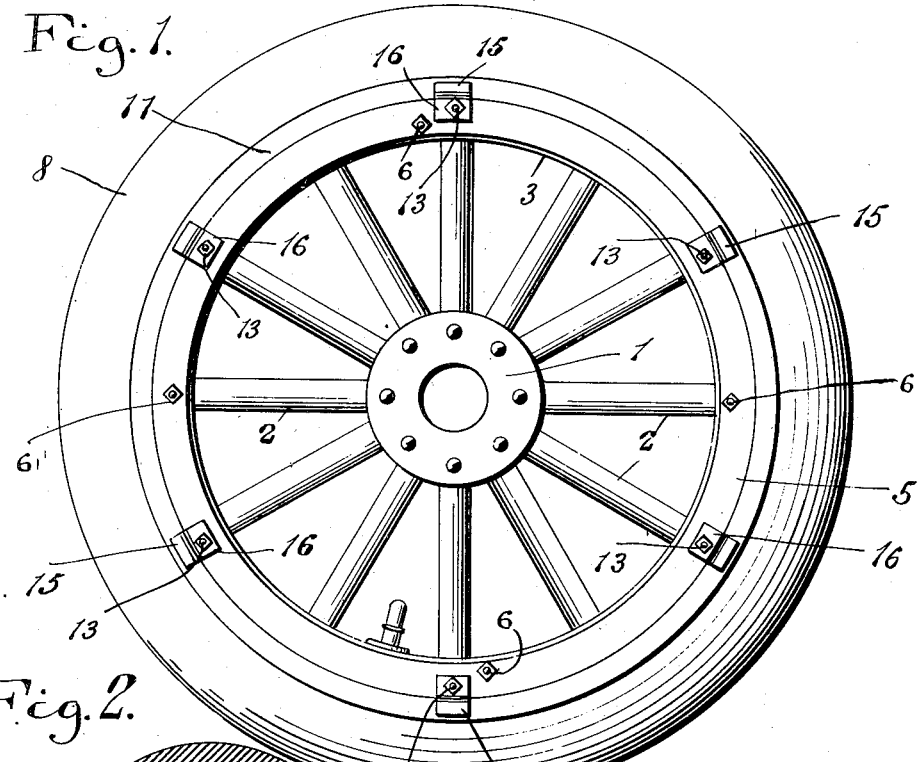
Figure 2:
Figure 3:
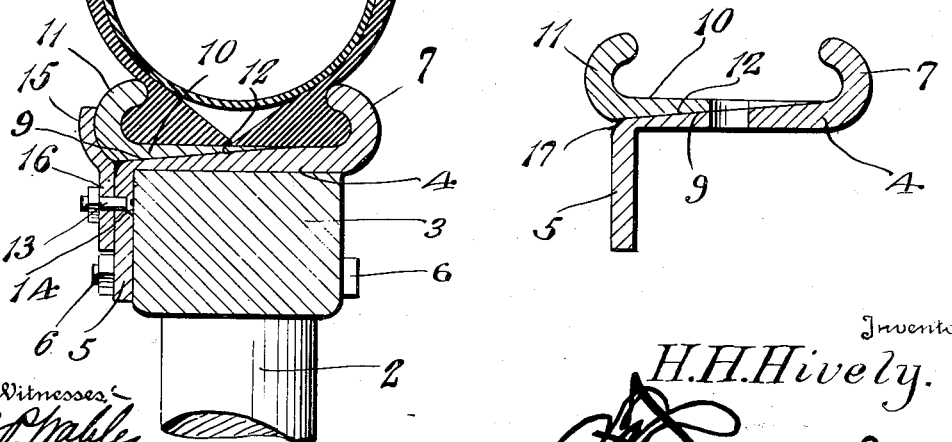

For a complete understanding of my invention, reference will be had to the following description and accompanying drawings, in which:

Figure 1 is a front elevation of a sectional tire rim constructed in accordance with my invention, illustrating it applied to a wheel, Figure 2 is a fragmentary transverse sectional view of the same, Figure 3 is a detail transverse sectional view of the rim.

Referring in detail to the drawing, the numeral 1 indicates the hub of a wheel having the usual spokes 2 secured thereto and on which is mounted the usual felly 3.

An inner member 4 is placed upon the felly 3 and has formed on one edge thereof an annular flange 5 for an engagement with one face of the felly. The annular flange 5 is provided with a plurality of apertures to receive bolts 6 that extend through the felly 3 for firmly securing the inner member 4 to the felly. Formed upon the opposite edge of the inner member 4 from the annular flange 5 is a curved retaining flange 7 which receives one of the beads of a tire or shoe 8. The outer face of the inner member 4 is beveled as illustrated at 9 in the direction of the annular flange 5 for a purpose which will be hereinafter more fully described.

An outer member 10 has the usual curved flange 11 for receiving the other bead of the tire or shoe 8 as clearly illustrated in Figure 2. The under face of the outer member 10 is beveled as illustrated at 12 for cooperating with the beveled face 9 of the inner member 4 when the outer member 10 is placed about the inner member thus providing a construction, wherein the outer member 10 may easily slide upon the inner member and upon further movement of the same in the direction of the curved flange 7 of the inner member 4, the binding action of the beveled faces of the members will increase, establishing a locking action between the pair of members.

Bolts 13 have their heads 14 seated in countersunk openings of the annular flange 5 and have secured thereon clips 15 by nuts 16 for an engagement with the curved flange 11 of the outer member 10, whereby the member 10 is efficiently held upon the inner member 4 and which provides a construction whereby the outer member 10 may be readily removed when desiring to remove the tire or shoe 8 from the wheel and also permitting the device when supporting an inflated tire to be removed from the felly by detaching the flange 5 from said felly.

The point of attachment or formation of the annular flange 5 on to the inner member 4 is rounded as illustrated at 17 to facilitate the easy insertion of the outer member 10 upon the inner member.

While I have shown and described the preferred embodiment of my invention, it will be understood that minor changes in construction, combination and arrangement of parts may be made without departing from the spirit and scope of the invention as claimed.

Having thus described my invention, what I claim is:

A demountable rim comprising a major section having a tire retaining flange and a radially inwardly extending flange, a tire retaining section seated on the major section and a plurality of clips pivoted to the inwardly extending flange of the major section so as to engage or disengage the tire retaining section, the inwardly extending flange of the major section being provided with holes intermediate of the clips for the reception of means to secure the rim to the wheel.

In testimony whereof I affix my signature in presence of two witnesses.

HAL HENERY HIVELY.

Witnesses:
H. A. McWILLIAMS,
HUGH McCAMMON.